Figure 1:
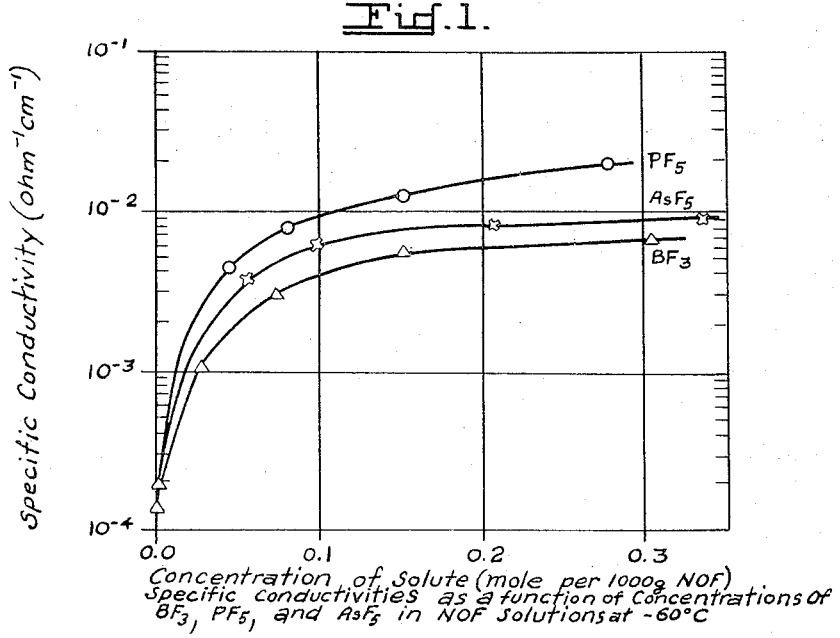

Feb. 13, 1968   M. S. TOY   3,368,926
LOW TEMPERATURE ELECTROCHEMICAL CELLS AND BATTERIES
Filed April 15, 1966   2 Sheets-Sheet 1

Specific conductivities as a function of concentrations of $BF_3$, $PF_5$, and $AsF_5$ in NOF solutions at $-60°C$ Specific Conductivity of $BF_3$ in NOF as a function of temperature INVENTOR,
Madeline S. Toy
BY: Harry M. Saragovitz,
Edward J. Kelly & A. J. Dupont
ATTORNEYS.

Specific Conductivity of $PF_5$ in NOF as a function of temperature

Specific Conductivity of $AsF_5$ in NOF as a function of temperature

# United States Patent Office 3,368,926
Patented Feb. 13, 1968

3,368,926
LOW TEMPERATURE ELECTROCHEMICAL
CELLS AND BATTERIES
Madeline S. Toy, Fountain Valley, Calif., assignor, by mesne assignments, to the United States of America as represented by the Secretary of the Army
Filed Apr. 15, 1966, Ser. No. 543,773
7 Claims. (Cl. 136—155)

This invention relates to a new and improved type of electrolytic cell and has particular relation to an electrolyte solution for use therein.

In electrolytic cells or batteries intended for extreme low-temperature service, the electrolyte employed must have a eutectic point at a temperature below that anticipated in the intended service. In the relatively new field of cryogenics, experimentation concerns itself with temperatures of $-60°$ C. and below. There are times during such experimentation when an internal power source is desirable. The ordinary dry cell becomes inoperative at about $-20°$ C. and even recent improvements lower its operability to only $-50°$ C. At these lower limits of temperature the electrolyte solution freezes and the internal resistance of the cell becomes very high.

An object of the present invention is to provide an electrolyte solution for a low-temperature electrolytic cell which will permit efficient operation from $-60°$ C. to $-132°$ C.

Another object of the invention is to provide an electrolyte solution which will have desirable dry cell characteristics, including solubility of the salts contained therein, freezing temperature, viscosity, resistivity, temperature coefficient, acidity and satisfactory chemical reactions with other constituents of the cell at low temperatures. These and other objects of the invention will be better understood by reference to the accompanying description and by the curves shown in FIGURES 1 to 4 of the drawings.

I have discovered that liquid nitrosyl fluoride is an excellent ionizing solvent. It has a relatively high degree of self-ionization which probably occurs in the following manner:

$$NOF \rightleftharpoons NO^+ + F^-$$

The advantages of nitrosyl fluoride as a solvent for electrochemical cells and batteries are: (1) its low temperature liquid range (M.P. $-132°$ C. and B.P. $-60°$ C.), (2) its solvation characteristics enabling it to form highly conductive electrolytic solutions ($10^{-2}$ ohm$^{-1}$ cm.$^{-1}$) at temperatures below $-60°$ C., and (3) its high electrochemical energy potential due to higher free energy change of fluorination reactions as compared to oxidation reactions.

Further, experimentation indicated that liquid nitrosyl fluoride is a good ionizing solvent for nonpolar Lewis acids such as boron trifluoride, phosphorus pentafluoride and arsenic pentafluoride and the nitrosyl (e.g. NOBF$_4$, NOPF$_6$, NOAsF$_6$) and nitryl (e.g. NO$_2$AsF$_6$, NO$_2$SbF$_6$) salts of such acids. These mixtures form highly conductive electrolytic solutions at temperatures below $-60°$ C.

SPECIFIC CONDUCTIVITIES OF SOME NITROSYL AND NITRYL SALTS IN LIQUID NITROSYL FLUORIDE

| Solute | Concentration (mole/liter) | Temperature (° C.) | Specific Conductivity (ohm$^{-1}$ cm.$^{-1}$) |
|---|---|---|---|
| NOBF$_4$ | 0.403 | $-90$ | $4.42 \times 10^{-3}$ |
| NOPF$_6$ | 0.379 | $-90$ | $1.33 \times 10^{-2}$ |
| NOAsF$_6$ | 0.446 | $-90$ | $5.41 \times 10^{-3}$ |
| NO$_2$AsF$_6$ | 1.0 | $-80$ | $1.15 \times 10^{-2}$ |
| NO$_2$SbF$_6$ | 1.0 | $-80$ | $1.63 \times 10^{-2}$ |
| NOF | Pure | $-80$ | $6.24 \times 10^{-5}$ |
| NOF | Pure | $-90$ | $3.95 \times 10^{-5}$ |

The effect of the addition of the nonpolar Lewis acids to nitrosyl fluoride can more easily be seen by reference to FIGURE 1 which depicts specific conductivities as a function of concentrations of BF$_3$, PF$_5$, and AsF$_5$ in NOF solutions at $-60°$ C. At that temperature the specific conductivity increases proportionately with the addition of the acid, reaching maximum conductivity at a concentration of approximately 0.286 mole per 1000 grams of NOF for PF$_5$, 0.336 mole per 1000 grams of NOF for AsF$_5$, and 0.304 mole per 1000 grams of NOF for BF$_3$. As can be further derived from FIGURE 1, at the stated maximum effective concentrations the approximate specific conductivities are $9.0 \times 10^{-1}$ ohm$^{-1}$ cm.$^{-1}$ for PF$_5$, $1.9 \times 10^{-2}$ ohm$^{-1}$ cm.$^{-1}$ for AsF$_5$, and $3.8 \times 10^{-2}$ ohm$^{-1}$ cm.$^{-1}$ for BF$_3$.

Figure 2:
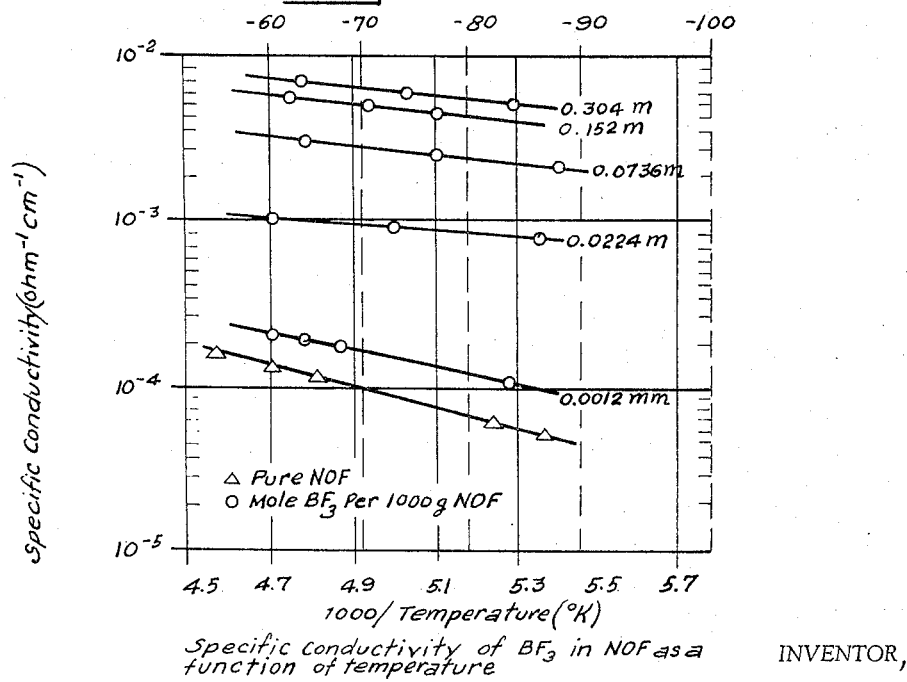

FIGURE 2 illustrates the specific conductivity as a function of temperature of varying concentrations of BF$_3$ in NOF. At a concentration of 0.304 mole BF$_3$ per 1000 grams of NOF, the specific conductivity decreases as the temperature decreases, from a high of $3.5 \times 10^{-2}$ ohm$^{-1}$ cm.$^{-1}$ at $-60°$ C. It can be seen that the BF$_3$ solution exhibits considerably greater specific conductivity than pure NOF which has a specific conductivity of $9.5 \times 10^{-3}$ ohm$^{-1}$ cm.$^{-1}$ at $-60°$ C.

Figure 3:
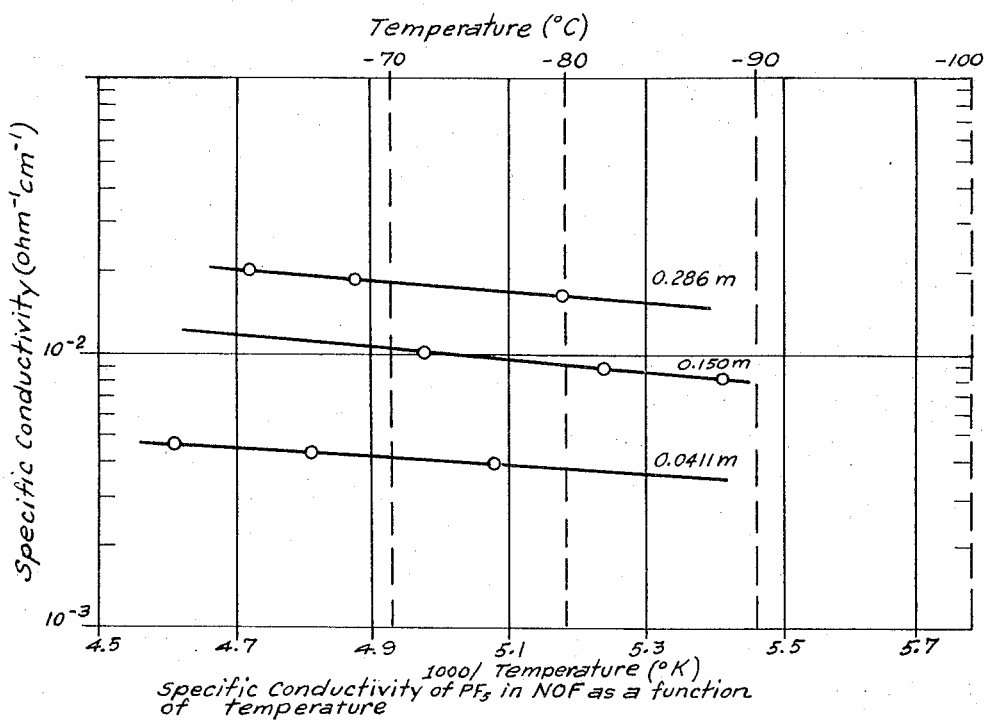

In the same manner, FIGURE 3 describes the relationship between temperature and the specific conductivity of various concentrations of phosphorus pentafluoride in nitrosyl fluoride. The most suitable concentration is 0.286 mole of PF$_5$ per 1000 grams of NOF which, for example, has a specific conductivity of $9.3 \times 10^{-1}$ ohm$^{-1}$ cm.$^{-1}$ at $-80°$ C.

Figure 4:
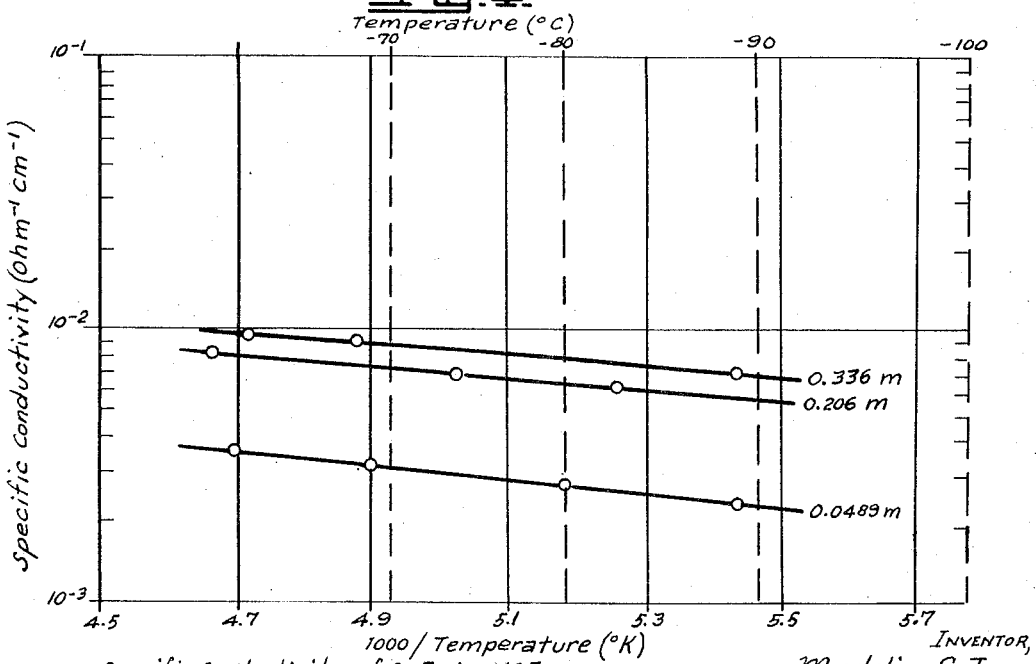

Similarly, FIGURE 4 shows AsF$_5$ in the context of concentration, temperature and specific conductivity. The suggested concentration of arsenic pentafluoride is 0.336 mole per 1000 grams of NOF. That solution has a specific conductivity of $4.0 \times 10^{-2}$ ohm$^{-1}$ cm.$^{-1}$ at $-90°$ C.

While only preferred forms of the invention are shown and described, other forms thereof are contemplated and numerous changes and modifications may be made therein without departing from the spirit of the invention as set forth in the appended claims.

What is claimed is:

1. A low-temperature battery having an electrolyte therein, said electrolyte comprising liquid nitrosyl fluoride.

2. The electrolyte set forth in claim 1, including at least one nonpolar Lewis acid from the group of acids consisting of phosphorus pentafluoride, arsenic pentafluoride and boron trifluoride.

3. The electrolyte set forth in claim 2, wherein phosphorus pentafluoride comprises up to 0.286 mole per one-thousand grams of nitrosyl fluoride, arsenic pentafluoride comprises up to 0.336 mole per one-thousand grams of nitrosyl fluoride, and boron trifluoride comprises up to 0.304 mole per one-thousand grams of nitrosyl fluoride.

4. The electrolyte set forth in claim 1, including at least one nitrosyl salt from the group consisting of $NOBF_4$, $NOPF_6$, and $NOAsF_6$.

5. The electrolyte set forth in claim 4, wherein the concentration of said $NOBF_4$ is 0.403 mole per liter of NOF, of $NOPF_6$ is 0.379 mole per liter of NOF, and of $NOAsF_6$ is 0.446 mole per liter of NOF.

6. The electrolyte set forth in claim 1, including at least one nitryl salt from the group consisting of $NO_2AsF_6$ and $NO_2SbF_6$.

7. The electrolyte set forth in claim 6, wherein the concentration of $NO_2AsF_6$ is 1.0 mole per liter of NOF and of $NO_2SbF_6$ is 1.0 mole per liter of NOF.

References Cited

UNITED STATES PATENTS

| | | | |
|---|---|---|---|
| 2,773,786 | 12/1956 | Jobe | 136—155 |
| 2,950,999 | 8/1960 | Craig et al. | 136—155 |
| 3,320,140 | 5/1967 | Yodis | 204—59 |

ALLEN B. CURTIS, *Primary Examiner.*

D. L. WALTON, *Assistant Examiner.*